(12) United States Patent
Kuwahara et al.

(10) Patent No.: US 9,186,936 B2
(45) Date of Patent: Nov. 17, 2015

(54) TIRE

(75) Inventors: Nagakazu Kuwahara, Kodaira (JP); Akiyoshi Shimizu, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1313 days.

(21) Appl. No.: 13/058,953

(22) PCT Filed: Aug. 12, 2009

(86) PCT No.: PCT/JP2009/064272
§ 371 (c)(1),
(2), (4) Date: Feb. 14, 2011

(87) PCT Pub. No.: WO2010/021288
PCT Pub. Date: Feb. 25, 2010

(65) Prior Publication Data
US 2011/0139324 A1    Jun. 16, 2011

(30) Foreign Application Priority Data

Aug. 22, 2008  (JP) ................................ 2008-213645

(51) Int. Cl.
*B60C 11/11* (2006.01)
*B60C 11/03* (2006.01)
*B60C 11/12* (2006.01)

(52) U.S. Cl.
CPC ............. *B60C 11/11* (2013.01); *B60C 11/0306* (2013.04); *B60C 11/12* (2013.01);
(Continued)

(58) Field of Classification Search
CPC ................... B60C 2011/0374; B60C 11/0306; B60C 11/11
USPC .................. 152/209.18, 209.25, 209.27, 902, 152/DIG. 3
See application file for complete search history.

(56) References Cited

U.S. PATENT DOCUMENTS 4,732,195 A * 3/1988 Takeuchi .................. 152/209.25
4,784,200 A * 11/1988 Fujiwara .................. 152/209.18
(Continued)

FOREIGN PATENT DOCUMENTS

JP      6-171318 A    6/1994
JP      9-136516 A    5/1997
(Continued)

OTHER PUBLICATIONS

English machine translation of JP2000-233609, dated Aug. 2000.*
(Continued)

*Primary Examiner* — Richard Crispino
*Assistant Examiner* — Robert Dye
(74) *Attorney, Agent, or Firm* — Sughrue Mion, PLLC

(57) ABSTRACT

An object of the present invention is to provide a tire possessing improved wear resistance by optimizing configurations of block land portions. The tire is configured such that, in at least two adjacent block land portion arrays 5 sandwiching a circumferential groove 2, adjacent block land portions 4 constituting the block land portion arrays 5 are arranged so as to be positionally displaced from each other in the tire circumferential direction; and a distance $d_2$ between the block land portions adjacent in the tire width direction is shorter than a distance $d_1$ between the block land portions adjacent in the tire circumferential direction. A groove portion 8 between the block land portions adjacent in the tire width direction extends obliquely with respect to the tire width direction and the tire circumferential direction. Further, plural sets each formed by at least two adjacent block land portion arrays 5 sandwiching the circumferential groove 2 are arranged; and, among the block land portions arrays 5, an inclination angle $\theta_1$ of an extending direction of the groove portion 8B between the block land portions adjacent in the tire width direction of block land portion arrays 5 located closest to a tire equatorial plane CL side with respect to the tire circumferential direction is larger than an inclination angle $\theta_2$ of an extending direction of the groove portion 8A between the block land portions adjacent in the tire width direction of block land portion arrays 5 located at the outermost side in the tire width direction with respect to the tire circumferential direction.

11 Claims, 8 Drawing Sheets

(52) U.S. Cl.
CPC . *B60C2011/0344* (2013.04); *B60C 2011/0346* (2013.04); *B60C 2011/0348* (2013.04); *B60C 2011/0374* (2013.04)

(56) References Cited

U.S. PATENT DOCUMENTS

| | | | |
|---|---|---|---|
| 4,962,801 A | | 10/1990 | Tsuda |
| 5,010,936 A | * | 4/1991 | Numata et al. ............ 152/209.14 |
| 6,170,546 B1 | * | 1/2001 | Koyama et al. ........... 152/209.18 |
| 2006/0102267 A1 | * | 5/2006 | Takahashi et al. ........ 152/209.18 |

FOREIGN PATENT DOCUMENTS

| | | | |
|---|---|---|---|
| JP | 2000108615 | | 4/2000 |
| JP | 2000233609 | | 8/2000 |
| JP | 2004-224131 | * | 8/2004 |
| JP | 2007-38924 A | | 2/2007 |
| JP | 2007145209 | | 6/2007 |

OTHER PUBLICATIONS

English machine translation of JP2004-224131, dated Aug. 2004.*
International Search Report issued in PCT/JP2009/064272 dated Oct. 20, 2009 (2 pages).
Chinese Office Action dated Nov. 2, 2012 issued in Chinese Application No. 200980142169.8.
Chinese Office Action, dated Jun. 9, 2013, issued in corresponding Chinese Patent Application No. 200980142169.8.
European Search Report issued in Application No. 09808224.1 dated Aug. 17, 2011.

* cited by examiner (a)

(b)

TIRE

TECHNICAL FIELD

The present invention relates to a tire having, on a tread portion, plural tire-circumferential grooves extending in a circumferential direction of the tire and plural lateral grooves each communicating adjacent two tire-circumferential grooves, thereby to define plural block land portion arrays formed by a large number of block land portions, and in particular to a tire for heavy load, aimed at improving wear resistance of the tire.

RELATED ART

In general, a tire for heavy load is designed to have a high aspect ratio and high belt rigidity of the tire so as to be able to bear considerable amount of weight. Further, in many cases, the tire for heavy load is designed to have a tread pattern in which block land portions are arranged over the entire tread portion so as to be able to travel under various traveling conditions.

The tire for heavy load having such a pattern can bear heavier load as compared with tires for general vehicles, and hence, partial wear resulting from heel and toe wear is likely to occur during travel in proportion to the amount of load that the tire bears. The heel and toe wear refers to wear in which, due to excess deformation of block land portions at the time when the tire is rotated with load, a wear amount of a leading edge (portion that first comes into contact with ground) of the tire in the tire circumferential direction is smaller, and the wear amount of a trailing edge (portion that finally comes into contact with ground) of the tire in the tire circumferential direction is larger. As a result, there occurs a difference in wear mainly between both edges of the block land portion in the circumferential direction of the tire, reducing the lifetime of the tire in terms of wear.

Conventionally, for the problem of partial wear as described above, various countermeasures for suppressing the partial wear have been attempted. Of the countermeasure, as disclosed in Patent Literature 1 for example, there is proposed an effective method for preventing the partial wear resulting from collapsing deformation, which includes: reducing a depth of a part of lateral grooves defining a block, that is, by forming a bottom-raised portion in each of the lateral grooves to strengthen stress against collapsing deformation of the block land portion toward the circumferential direction of the tire to suppress increase in the driving force per unit area that the tread portion has to bear.

Tires for heavy load for used in trucks or buses have a high aspect ratio and high belt rigidity. Thus, at the time when the tire is rotated with load, there occurs friction between a belt portion, which is rotated by driving force, and a tread portion, which is in contact with the ground, generating a difference in deformation between the belt portion and the tread portion as illustrated in FIG. 1, whereby the tread portion excessively collapses and deforms. This increases the amount of driving force per unit area that the tread portion has to bear, and sliding phenomenon occurs between a block land portion and the ground, causing an increase in the amount of wear of the block land portion. Although a tire described in Patent Literature 1 can produce an effect of preventing the partial wear on a certain level, Patent Literature 1 cannot sufficiently suppress collapsing and deformation of the block land portion at the time of tire rotation with load. Therefore, the tire described in Patent Literature 1 cannot suppress the increase in the amount of wear of the block land portion caused by the sliding phenomenon, and a problem of wear resistance is left unsolved. Further, in general, it is possible to effectively suppress the amount of wear of the block land portion, by increasing the rigidity of a rubber forming the block land portion to suppress the excess collapsing and deformation of the block land portion. However, this excessively increases the rigidity of the block land portion, possibly causing the block land portion to break due to chip or crack at the time when the tire is rotated with load.

REFERENCE DOCUMENT

Patent Literature

Patent Literature: Japanese Patent Application Laid-Open no. 6-171318

DISCLOSURE OF THE INVENTION

Problems to be Solved by the Invention

To solve such a problem that the conventional technique has, the present applicant proposed, in an international application of PCT/JP2008/59826, as illustrated in FIG. 2, a tire having, on a tread portion, plural circumferential grooves extending in a circumferential direction of a tire, and plural lateral grooves each communicating adjacent two circumferential grooves, thereby to define plural block land portion arrays formed by a large number of block land portions, in which: between block land portion arrays sandwiching the circumferential groove and adjacent to each other, the block land portions constituting the block land portion arrays are arranged so as to be positionally displaced from each other in the tire circumferential direction; a groove portion between the block land portions adjacent to each other in the width direction of the tire extends obliquely with respect to the width direction of the tire and the circumferential direction of the tire; a distance between the block land portions adjacent to each other in the width direction of the tire is shorter than a distance between the block land portions adjacent to each other in the circumferential direction of the tire; and, a length of the block land portion in the widthwise cross section of the tire increases from both edge portions of the block land portion in the circumferential direction of the tire toward a central portion of the block land portion. With the configuration above, it is possible to suppress partial wear resulting from sliding wear by suppressing excess deformation of the block land portion while improving water discharging performance by increasing a negative ratio of the tread portion to maintain traction performance on a wet road, so that wear resistance can be improved. This technique will be described in detail below.

The present inventor found that: an increase in belt rigidity leads to a decrease in an area where a tread surface is brought into contact with a road surface; shearing force in the circumferential direction of the tire excessively increases when the tread steps in that causes sliding wear to occur; and, this causes reduced wear resistance. FIG. 3 shows a change in the shearing force (force acting in the driving direction and on the contacting surface of the tire) acting in the circumferential direction from the step-in time to the kick-out time at given positions of the block land portion in a road-contacting state while the driving force is being applied, the change being plotted from the time when load by driving force is not applied to the tire. As shown in the solid line, in the conventional tire, at the step-in time, the shearing force in the circumferential direction is almost equal to the shearing force acting at the time when driving force is not applied, and then, monotonously increases toward the kick-out time. The total amount (integral value of the shearing force in the circumferential direction generated from the step-in time to the kick-out time) of those forces generated from the step-in time to the kick-out time makes a vehicle accelerate, functioning as the force acting on a tire axis. If the contacting surface decreases, the decrease of the integral value resulting from the decrease in the area is compensated with change in the force per unit area being steeper from the step-in time to the kick-out time. As a result, the shearing force in the circumferential direction at the kick-out time increases, which reduces the wear resistance. The present inventor made a keen study on the basis of an idea that the integral value above can be compensated by generating the shearing force (change from the time when driving force is not applied) in the circumferential direction from the step-in time so as to decrease the shearing force in the circumferential direction at the kick-out time, as shown in the broken line in FIG. 3. As a result, it is found that the characteristic shown in the broken line in FIG. 3 can be obtained by efficiently generating the force at the step-in time such that: as shown in FIG. 4, at the time when the driving force is applied, the shearing force is generated at a block land portion that has already been stepped in, causing the block land portion to deform; as deformation by the shearing force increases, the block land portion rises accordingly, causing reaction at the next block land portion; the deformation of the next block land portion increases as said next block land portion is pressed on the road surface side. Although it is also found that this phenomenon effectively works by reducing a distance between the block land portions in the circumferential direction of the tire, the block land portions come into contact with each other at the time when the distance between the block land portions in the circumferential direction of the tire is too short and the tire is brought into contact with the road surface, as illustrated in FIG. 5. This causes force to be generated in the same direction as that of the driving force at the kick-out time, which adversely deteriorates the wear resistance. The present inventor sought a configuration that can effectively utilize the action between the block land portions while eliminating the effect caused by the contact between the block land portions in the circumferential direction of the tire, and as a result, found the configuration of the present invention. According to the configuration of the present invention, the tread portion is configured such that: between two block land portion arrays adjacent to each other in the width direction of the tire, the block land portions constituting the block land portion arrays are arranged so as to be positionally displaced from each other in the circumferential direction of the tire; a groove portion between block land portions adjacent to each other in the width direction of the tire extends obliquely with respect to the width direction of the tire and the circumferential direction of the tire; and a distance between block land portions adjacent to each other in the width direction of the tire is shorter than a distance between block land portions adjacent to each other in the circumferential direction of the tire, whereby it is possible to suppress an expansion component (FIG. 5) of a rubber caused by the contact of the block land portions adjacent to each other in the circumferential direction of the tire, while effectively bearing the driving force at the step-in time using reaction between the block land portions by making the most of the configuration in which the groove portion between the block land portions adjacent to each other in the width direction of the tire extends obliquely with respect to the width direction of the tire and the circumferential direction of the tire and the distance between the block land portions is shorter. With this configuration, a gradient of shearing force in the circumferential direction of the tire from the step-in time to the kick-out time is made small, so that the sliding wear can be reduced.

The present inventor made a keen study on wear of the block land portion in a case where a tire having block land portions, in particular, a tire for heavy load having a high aspect ratio is used in a drive wheel, and as a result, found the following. More specifically, if the block land portion is pressed against and is brought into contact with the road surface in a horizontal manner, a stress caused by incompressibility of rubber is concentrated on a leading edge and a trailing edge of the block land portion as shown in FIG. 6A. However, at the time of the kick-out time, tread wear occurs due to slippage of the tread portion, and the tread portion is pressed obliquely against the road surface because of existence of a belt, so that the stress caused by the incompressibility of rubber is born by the central portion of the block land portion as shown in FIG. 6B. In particular, in a case where the tire has a high aspect ratio and high belt rigidity, the tread portion is further strongly pressed obliquely against the road surface, and as a result, the stress caused by the incompressibility of rubber is further largely born by the central portion of the block land portion. The force accompanied by this compression and deformation is applied in the same direction as the traveling direction of the vehicle, and is added with the driving force from the engine torque, which leads to increase in the sliding wear. Therefore, by increasing the length of the block land portion in the widthwise cross section of the tire from both edge portions of the block land portion 4 in the circumferential direction of the tire toward the central portion of the block land portion as described above, it is possible to concentrate the compressive stress on the central area of the block land portion as shown in FIG. 6B when the block land portion is obliquely brought into contact with the road surface. As a result, even if there occurs a force that causes the rubber at the central area of the block land portion 4 to deform from the trailing edge toward the leading edge, forces Q occur in which wall portions of the block land portion located on the trailing edge side of the block land portion and obliquely inclined with respect to the tire circumferential direction expand in the direction of the normal to said wall portions of the block land portion, as shown in FIG. 7. At this time, components R of the forces Q acting to expand are generated from the right and the left wall portions of the block land portion, act in opposite directions to each other, and are cancelled with each other within the block land portion, whereby the other components P of the forces Q act against a force that causes the rubber at the central area of the block land portion to deform from the trailing edge toward the leading edge. Further, as shown in FIG. 8, comparison was made between deformation (solid line) of a block land portion having the configuration of the block land portion arrays adjacent to each other as described above but having a constant length of widthwise cross section of the tire, with deformation (broken line) of a block land portion having the configuration of the block land portion arrays adjacent to each other as described above and having a length of the widthwise cross section of the tire that increases from both edge portions of the block land portion in the circumferential direction of the tire toward the central portion of the block land portion when the driving force is applied to the block land portion. In the block land portion according to the latter case, although deformation of the rubber toward the trailing edge side of the block is suppressed at the step-in time due to the same mechanism as that of the kick-out time, the incompressibility of rubber causes the suppressed deformation to act in a direction in which the trailing edge of the block land portion that has been already stepped in is made further rise. This increases the shearing deformation of a block land portion to be stepped in next, thereby producing a synergistic effect as shown in FIG. 3 in which the shearing force at the step-in time increases and the shearing force at the kick-out time decreases, which has larger effect on wear. As a result, the excess deformation of the block land portion is suppressed, whereby it is possible to effectively prevent the partial wear and slip wear of the block land portion.

However, there is a demand for a tire having prolonged lifetime, that is, having further improved wear resistance. In view of the facts described above, an object of the present invention is to provide a tire having further improved wear resistance by optimizing shapes of block land portions and arrangement of the block land portions.

Means for Solving the Problem

In order to achieve the object above, the present invention provides a tire having, on a tread portion, plural circumferential grooves extending in a circumferential direction of the tire and plural lateral grooves each communicating adjacent two circumferential grooves, thereby to define plural block land portion arrays formed by a large number of block land portions, in which, in at least two adjacent block land portion arrays sandwiching the circumferential groove, adjacent block land portions constituting the block land portion arrays are arranged so as to be positionally displaced from each other in the tire circumferential direction; a distance between the block land portions adjacent to each other in the tire width direction is shorter than a distance between the block land portions adjacent to each other in the tire circumferential direction; a groove portion between the block land portions adjacent to each other in the width direction of the tire extends obliquely with respect to the tire width direction and the tire circumferential direction; a plurality of sets each formed by at least two adjacent block land portion arrays sandwiching the circumferential groove are arranged; and, among the block land portions arrays, an inclination angle of an extending direction of the groove portion between the block land portions adjacent in the tire width direction of block land portion arrays located closest to a tire equatorial plane side with respect to the tire circumferential direction is larger than an inclination angle of an extending direction of the groove portion between the block land portions adjacent in the tire width direction of block land portion arrays located at the outermost side in the tire width direction with respect to the tire circumferential direction. In this specification, the term "groove portion" refers to a portion of the circumferential groove and a groove extending between the block land portions adjacent in the tire width direction, and the expression "be positionally displaced" means arrangement in which beginning points of the respective block land portions adjacent in the width direction of the tire are arranged differently from each other at pitches, so that an edge of one block land portion in the circumferential direction is not the same as an edge of the other block land portion adjacent to said one block land portion in the width direction of the tire.

Further, it is preferable that, in the block land portion arrays sandwiching the circumferential groove and adjacent to each other, the inclination angle of the extending direction of the groove portion between the block land portions adjacent in the tire width direction with respect to the tire circumferential direction is set such that the groove portion located closer to the tire equatorial plane has the lager inclination angle.

Yet further, it is preferable that a length of the block land portion in a widthwise cross section of the tire increases from both edge portions of the block land portion in the tire circumferential direction toward a central portion of the block land portion. In this specification, the term "central portion of the block land portion" refers to a region extending from the center of the block land portion in the circumferential direction of the tire toward both ends of the block land portion and having a length in a range of 5-30% of the length of the block land portion in the tire circumferential direction. More specifically, it refers to a region of the block land portion excluding 20% from an end of the block land portion in the circumferential direction.

Yet further, it is preferable that, among groove portions between the block land portions adjacent in the tire width direction, an inclination angle of the groove portion located closest to the equatorial plane with respect to the tire circumferential direction is in a range of 15 to 70°.

Yet further, it is preferable that, among groove portions between the block land portions adjacent in the tire width direction, an inclination angle of the groove portion located closest to a shoulder with respect to the tire circumferential direction is less than or equal to 20°.

Yet further, it is preferable that a ratio of a distance between the block land portions adjacent in the tire width direction with respect to a distance between the block land portions adjacent in the tire circumferential direction is in a range of 0.85:1 to 0.3:1.

Yet further, it is preferable that a ratio of a distance between the block land portions adjacent in the tire circumferential direction with respect to a length of the block land portion in the tire circumferential direction is in a range of 0.25:1 to 0.05:1.

Yet further, it is preferable that a distance between the block land portions adjacent in the tire width direction is in a range of 1.0 to 5.0 mm.

Yet further, it is preferable that a distance between the block land portions adjacent in the tire circumferential direction is in a range of 3.0 to 10.0 mm.

Yet further, it is preferable that each of the block land portions is provided with a narrow groove communicating, in the tire width direction, two circumferential grooves adjacent to said block land portion.

Yet further, it is preferable that the narrow groove opens to the circumferential groove at the central portion of the block land portion.

Yet further, it is preferable that a length of the narrow groove in the tire circumferential direction is in a range of 5 to 20% of a depth of a lateral groove.

Effect of the Invention

According to the present invention, it is possible to provide a tire possessing improved wear resistance by optimizing the configurations of block land portions.

BEST MODE FOR CARRYING OUT THE INVENTION

Figure 9:
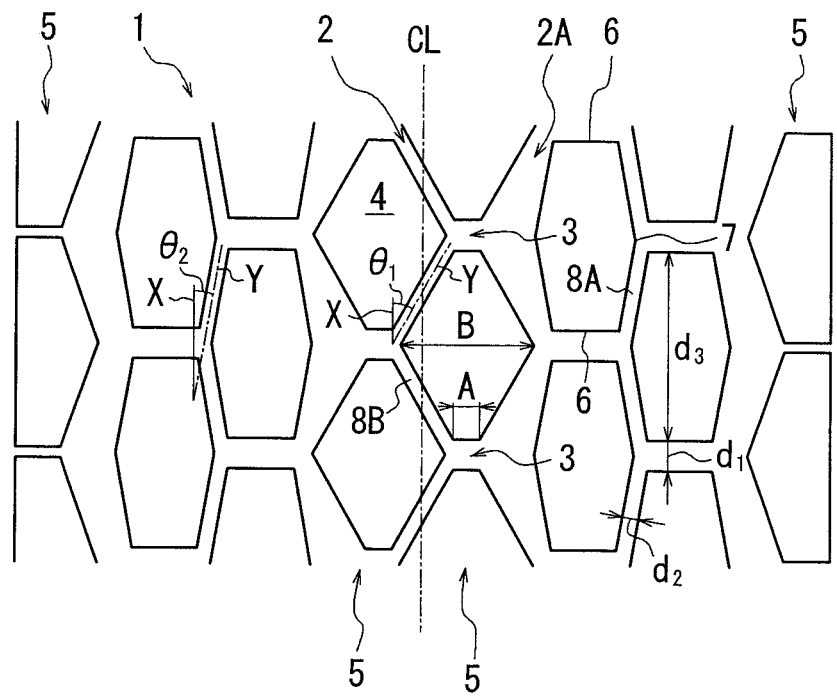
FIG. 9 is a development view illustrating a part of the tread portion of a typical tire according to the present invention.
Figure 10:
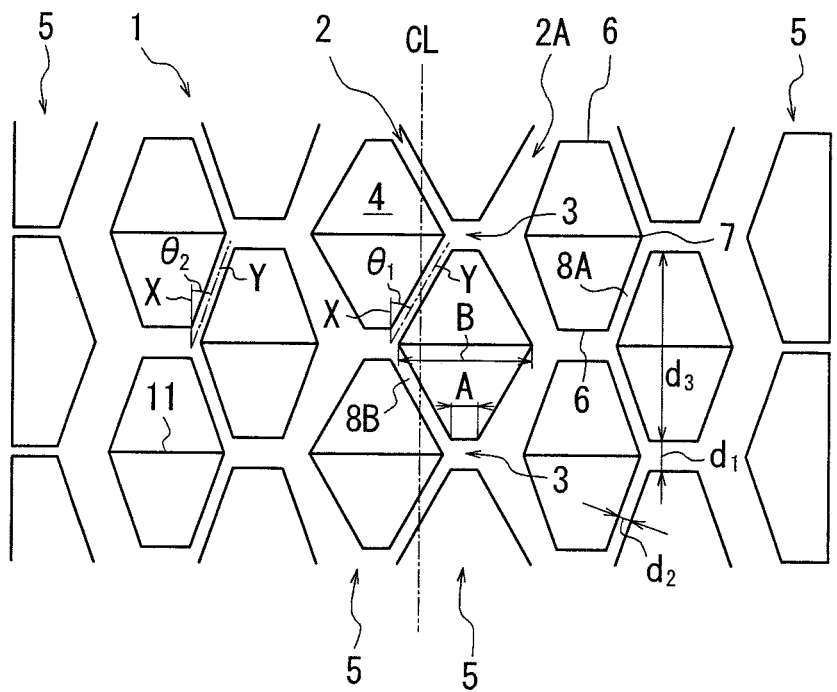
FIG. 10 is a development view illustrating a part of the tread portion of other tire according to the present invention; and, FIG. 11 is a development view illustrating a part of the tread portion of other tire according to the present invention.
Figure 11:
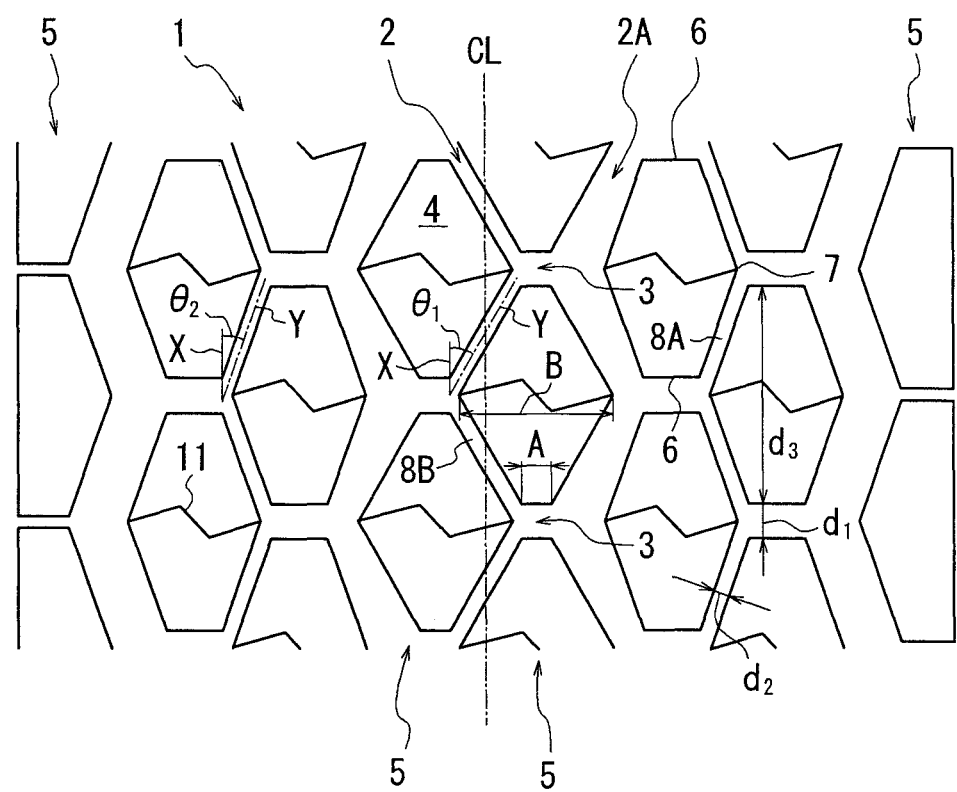

Hereinbelow, an embodiment of the present invention will be described with reference to the drawings. FIG. 9 is a development view illustrating a part of a tread portion of a typical tire according to the present invention. FIGS. 10 and 11 are development views illustrating parts of tread portions of the other tires according to the present invention.

In the present invention, as illustrated in FIG. 9, a tire has, on a tread portion 1, plural circumferential grooves 2 extending in a circumferential direction X of the tire and plural lateral grooves 3 each communicating two adjacent circumferential grooves 2, thereby to define block land portion arrays 5 formed by a large number of block land portions 4. Further, a distance $d_2$ between the block land portions adjacent in the width direction of the tire is shorter than a distance $d_1$ between block land portions adjacent in the circumferential direction of the tire. Yet further, a length of tire-widthwise cross section of the block land portion 4 increases from both edge portions 6, 6 of the block land portion 4 in the circumferential direction toward a central portion 7 of the block land portion 4. Yet further, a groove portion 8 between the block land portions adjacent in the width direction of the tire extends in a direction Y oblique with respect to the tire width direction and the tire circumferential direction X, and an inclination angle θ of the extending direction Y of the groove portion 8 with respect to the tire circumferential direction X is set such that an inclination angle at a groove portion 8B between the block land portions adjacent in the tire width direction of a block land portion array 5 located closest to an equatorial plane CL of the tire is larger than an inclination angle at a groove portion 8A between the block land portions adjacent in the tire width direction of a block land portion array 5 located at the outermost side of the width direction of the tire, that is, located closest to a shoulder of the tire.

Figure 8:
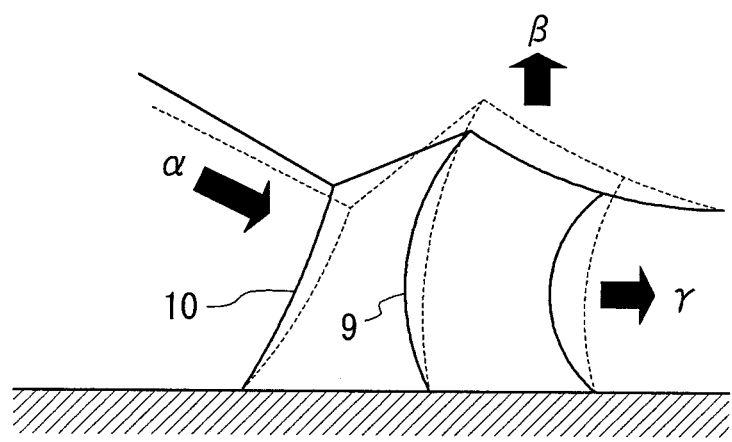
FIG. 8 is a view illustrating deformation of adjacent block land portions at the time when the driving force is applied (reference character α: increase in shearing deformation at a step-in time, reference character β: increase in the amount of rise, and reference character γ: decrease in deformation of the tread rubber directing opposite to the rotational direction)

With the configuration described above, it is possible to efficiently bear the driving force at the step-in time using the reaction between the block land portions 4 as illustrated in FIG. 8 by making the most of the configuration in which: the groove portion 8 between the block land portions adjacent in the width direction of the tire extends obliquely to the tire circumferential direction and the tire width direction; the length of the block land portion 4 in the widthwise cross section increases from both of the edge portions 6, 6 of the block land portion 4 in the tire circumferential direction toward the central portion 7 of the block land portion 4; and the distance between the block land portions is short, while suppressing the expansion component (FIG. 5) of the rubber due to the contact between the block land portions 4 adjacent in the circumferential direction. Note that it is preferable that the block land portions 4 adjacent in the circumferential direction of the tire are arranged so as to be positionally displaced by a half pitch in the circumferential direction of the tire. This is because, by positionally displacing the block land portions 4 by the half pitch, the deformation force resulting from collapsing and deforming when the tire is rotated with load can be effectively transferred to the block land portion 4 adjacent in the tire width direction, and the driving force per unit area that the tread portion 1 has to bear can be reduced, whereby it is possible to prevent the wear caused by the sliding phenomenon of the block land portions 4 with respect to the road surface. This makes it possible to reduce the gradient of the shearing force in the circumferential direction of the tire from the step-in time to the kick-out time and also reduce the shearing force at the kick-out time that causes the sliding wear, so that the sliding wear can be reduced. Further, considering a mutual effect between the block land portions as described above and sustainability of the effect until the end of the wear, it is preferable for a depth of the groove portion 8 between the block land portions adjacent in the width direction of the tire to be in a range of 60 to 100% of a groove depth of the circumferential groove 2A. Yet further, it is preferable that a ratio of a length B of the central portion 7 of the block land portion 4 in the width direction of the tire to a length A of the edge portion 6 of the block land portion 4 in the circumferential direction of the tire is in a range of 3:1 to 1.5:1. This is because, if the length ratio falls outside the range, the deformation of the block land portion 4 cannot be effectively prevent in such a case that the block land portion 4 obliquely comes into contact with the ground, possibly causing the partial wear and the sliding wear of the block land portions.

At this time, in the tire of the present invention, the inclination angle θ of the extending direction Y of the groove portion 8 between the block land portions adjacent in the width direction of the tire with respect to the circumferential direction X of the tire is set such that the inclination angle at the groove portion 8B between the block land portions adjacent in the tire width direction of the block land portion array 5 located closest to an equatorial plane CL of the tire is larger than the inclination angle at the groove portion 8A between the block land portions adjacent in the tire width direction of the block land portion array 5 located closest to the shoulder of the tire. In the illustrated example, an angle $θ_1$ formed by the circumferential direction of the tire X and the extending direction Y of the groove portion 8B located on the equatorial plane CL side of the tire is larger than an angle $θ_2$ formed by the circumferential direction X of the tire and the extending direction Y of the groove portion 8A located on the shoulder side. Further, the inventor found that a land portion located closest to the shoulder side of the tread portion 1 bears the large amount of lateral force at the time of traveling around a corner, and is worn more quickly as compared with a land portion located closest to the equatorial plane CL. Therefore, as described above, the lifetime of the tire can be prolonged by: reducing the inclination angle $θ_2$ of the groove portion 8A between the block land portions adjacent in the tire width direction of the block land portion array 5 located closest to the shoulder; making the length of the block land portion 4 in the tire width direction longer with respect to the tire width direction to increase rigidity of the block land portion 4 against the lateral force; reducing the wear of the block land portion 4 on the shoulder side as compared with the wear of the block land portion 4 on the equatorial plane CL; and, reducing a difference of speeds at which the block land portion wears between the equatorial plane side and the shoulder side, whereby the entire tread portion 1 wears uniformly.

Further, in the tire of the present invention, it is preferable that the groove portions 8 located closer to the equatorial plane CL side have the larger inclination angle θ of the extending direction Y of the groove portion 8 between the block land portions adjacent in the width direction of the tire with respect to the tire circumferential direction X. The larger inclination angle θ of the groove portion 8 yields larger effects of suppressing the sliding wear obtained by the configuration described above, thereby improving the wear resistance. The present inventor found that the land portion located closer to the tire equatorial plane of the tread portion 1 bears larger driving force, and is worn more quickly as compared with the land portion located closer to the shoulder (note that this is especially remarkable when a tire for heavy load carrying heavier load is mounted on a driving wheel for transferring torque from an engine and bears large load). Accordingly, in a case where the tread portion 1 is provided with plural block land portion arrays 5, there was a possibility that the block land portions 4 located closer to the tire equatorial plane CL bear larger driving force, and thus are worn more quickly, reducing a period of time until the time when the tire is discarded and shortening the lifetime of tire. On the other hand, as described above, it is possible to prolong the lifetime of tire by making the inclination angle θ of the groove portion 8 between the block land portions adjacent in the tire width direction of the block land portion array 5 located on the tire equatorial plane CL side larger than that of the block land portion 5 located on the shoulder side to reduce the wear of the block land portions 4 located on the tire equatorial plane CL side as compared with that located on the shoulder side; reducing a difference of speeds at which the block land portion wears between the equatorial plane side and the shoulder side, whereby the entire tread portion 1 wears uniformly. At this time, in order to effectively increase the wear resistance, it is preferable that, of the groove portions 8 between the block land portions adjacent in the tire width direction, the inclination angle θ ($θ_1$ in the illustrated example) of the groove portion 8B located closest to the tire equatorial plane with respect to the tire circumferential direction is in a range of 15 to 70°. Further, in order to reduce the difference of speeds at which the block land portion 4 wears between the shoulder side and the tire equatorial plane CL side to make the amount of wear uniform over the tread portion 1, it is preferable that, of the groove portions 8 between the block land portions adjacent in the tire width direction, the inclination angle θ ($θ_2$ in the illustrated example) of the groove portion 8A located closest to the shoulder with respect to the tire circumferential direction is less than or equal to 20°.

Additionally, it is preferable that, concerning the same block land portion 4, the groove portion 8 located between the block land portions adjacent in the tire width direction and facing the same circumferential groove 2 form an open angle opening to the opposite direction to the tire equatorial plane as viewed from the tire circumferential direction. This is because, in a case where the groove portion 8 between the block land portions adjacent in the tire width direction extends in one direction, it is possible to effectively deal with an input from a certain one direction to prevent the sliding wear, but there is a possibility that it is impossible to effectively deal with an input from other direction and to prevent the sliding wear. Further, the inclination of the extending direction of the groove portion between the block land portions adjacent in the tire width direction and the inclination of the block land portion 4 having the increased length of the widthwise cross section at the central portion 7 of the block land portion 4 are arranged so as to be made face with each other, it is possible to pattern the blocks without generating wasted spaces in the tire width direction, while effectively achieving the wear resistance performance without deteriorating both of the configuration and the effects, whereby it becomes easy to implement patter design by combining with a second rib, shoulder rib, lug and the like.

Further, it is preferable for a length $d_3$ of the block land portion 4 in the tire circumferential direction to be in a range of 1.0 to 2.5% of a circumferential length of the tire. In a case where the length $d_3$ of the block land portion 4 in the tire circumferential direction exceeds 2.5% of the circumferential length of the tire, rigidity against shearing force of the block undesirably increases, and hence there is a possibility that the block land portion 4 that has already been stepped in does not sufficiently rise in a manner described above. On the other hand, in a case where the length $d_3$ of the block land portion 4 in the tire circumferential direction is less than 1.0%, the rigidity of the block land portion 4 is undesirably low even if the length $d_3$ is less than or equal to 2.5% of the circumferential length of the tire. Thus, when the driving force is applied to the block land portion 4, the block land portion 4 excessively shears and deforms, and hence, the sliding wear cannot be sufficiently suppressed. Accordingly, by setting the length $d_3$ of the block land portion 4 in the tire circumferential direction in a range of 1.0 to 2.5% of the circumferential length of the tire, it is possible to secure the rigidity of the block land portion 4, and the effect of the block land portion 4 as described above can be achieved effectively, whereby it is possible to sufficiently prevent the wear resistance from decreasing.

Further, it is preferable that a ratio of the distance d2 between the block land portions adjacent in the width direction of the tire with respect to the distance d1 between the block land portions adjacent in the circumferential direction of the tire is in a range of 0.85:1 to 0.3:1, and is more preferably in a range of 0.7:1 to 0.4:1. In a case where the ratio of the distance d2 between block land portions adjacent in the width direction of the tire to the distance d1 between block land portions adjacent in the circumferential direction of the tire exceeds 0.3:1, the distance d2 between the block land portions adjacent in the width direction of the tire is undesirably short even if the distance d1 between block land portions adjacent in the circumferential direction of the tire is sufficient. Therefore, the block land portions 4 adjacent in the tire width direction are brought into contact with each other when the tire is rotated with load; the deformation force resulting from collapsing and deforming cannot be effectively transferred to the block land portion 4 adjacent in the tire width direction; and, the shearing force in the block land portion 4 cannot be effectively dispersed, possibly causing the sliding wear. On the other hand, in a case where the ratio of the distance d2 between block land portions adjacent in the width direction of the tire to the distance d1 between block land portions adjacent in the circumferential direction of the tire is less than 0.85:1, the distance d1 between the block land portions adjacent in the circumferential direction of the tire is undesirably short even if the distance d2 between block land portions adjacent in the width direction of the tire is sufficient. Therefore, the block land portions 4 are brought into contact with each other in the tire circumferential direction when the block land portions 4 come into contact with the road surface, and the deformation due to expansion of rubber illustrated in FIG. 5 occurs, possibly reducing the wear resistance.

Figure 5:
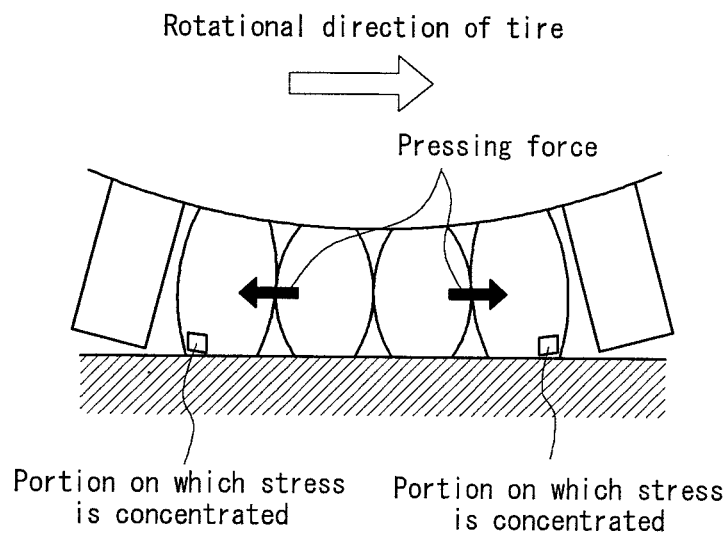
FIG. 5 is a view illustrating deformation of the block land portions when the block land portions adjacent to each other in the tire circumferential direction are undesirably close to each other.
Figure 6:
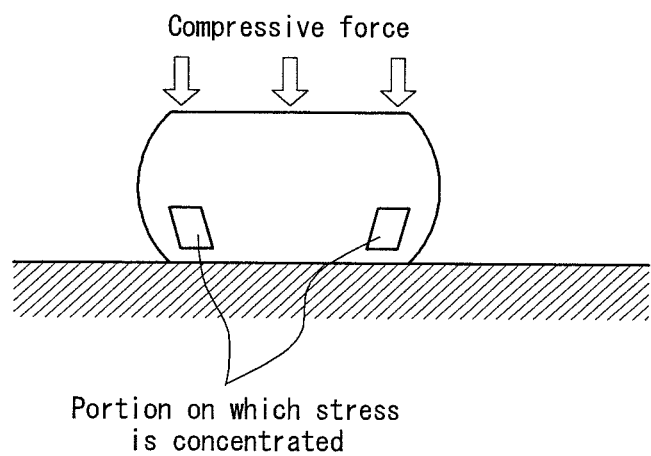
FIG. 6A is a view illustrating a block land portion that is pressed against and is in contact with the road surface in a horizontal manner.
FIG. 6B is a view illustrating a block land portion that is pressed against and is in contact with the road surface in a oblique manner.
Figure 6:
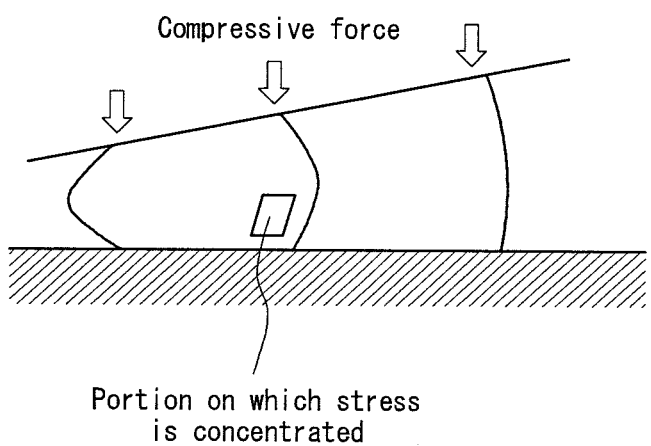
Figure 7:
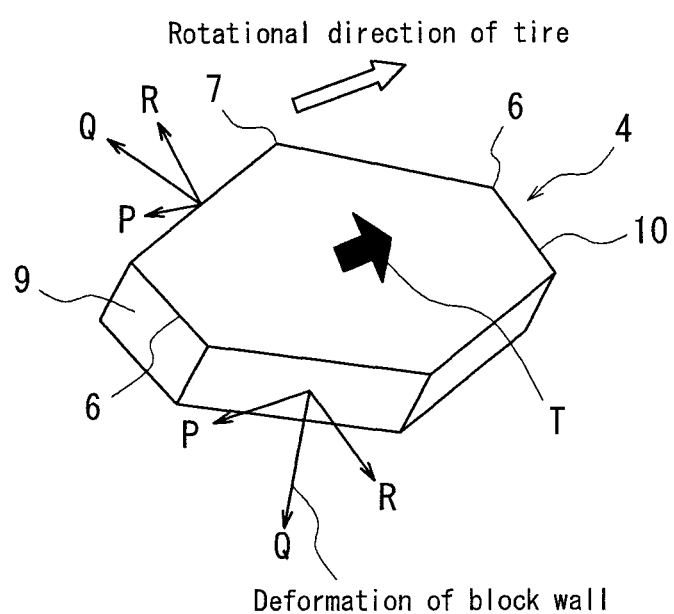
FIG. 7 is a perspective view illustrating the block land portion illustrated in FIG. 2 (reference character T: rubber deformed from a trailing edge to a leading edge by the oblique press)

Yet further, it is preferable that a ratio of the distance d1 between block land portions adjacent in the circumferential direction of the tire with respect to the distance d3 of the block land portion 4 in the circumferential direction of the tire is in a range of 0.25:1 to 0.05:1, and is in a range of 0.17:1 to 0.07:1. In a case where the ratio of the distance d1 between block land portions adjacent in the circumferential direction of the tire with respect to the distance d3 of the block land portion 4 in the circumferential direction of the tire exceeds 0.05:1, the block land portions 4 adjacent in the tire circumferential direction are undesirably close to each other when the block land portion 4 collapses and deforms at the time of rotation of tire with load. Therefore, as illustrated in FIG. 5, when the block land portions 4 of the tread portion 1 that are in contact with the road surface are pressed and deformed, the block land portions 4 adjacent in the tire circumferential direction at the center of the tread portion 1 are brought into contact with each other; another block land portion 4 located outer than said block land portions 4 is pressed toward the outer side in the tire circumferential direction; the block land portions 4 excessively collapse and deform in both a tire rotation direction and an opposite to the tire rotation direction. This increases a force acting at the trailing edge 9 in a direction in which the driving force is applied, possibly causing the sliding wear in which the trailing edge 9 side wears larger than the leading edge 10 side resulting from the collapsing and deformation. On the other hand, in a case where the ratio of the distance d1 between block land portions adjacent in the circumferential direction of the tire with respect to the distance d3 of the block land portion 4 in the circumferential direction of the tire is less than 0.25:1, the block land portions 4 adjacent in the tire circumferential direction are undesirably departed from each other. This makes it impossible to utilize the shearing force at the trailing edge 9 of the block land portion 4 to disperse the shearing force at the block land portions 4 adjacent in the circumferential direction in a well-balanced manner, also possibly causing the sliding wear.

Yet further, it is preferable that the distance $d_2$ between the block land portions adjacent in the tire width direction is in a range of 1.0 to 5.0 mm, and is more preferably in a range of 1.5 to 3.5 mm. In a case where the distance $d_2$ between the block land portions exceeds 5.0 mm, the distance $d_2$ between the block land portions adjacent in the tire width direction is undesirably long. Therefore, the deformation force resulting from collapsing and deforming cannot be transferred to block land portions 4 adjacent in the tire width direction, which causes the block land portion 4 to excessively collapse and deform in the tire circumferential direction, possibly causing the wear resulting from the sliding of the block land portion 4. On the other hand, the distance $d_2$ between the block land portions is less than 1.0 mm, the distance $d_2$ between the block land portions is undesirably short. Therefore, the block land portions 4 adjacent in the tire width direction are brought into contact with each other when the tire is rotated with load, and the deformation force resulting from the collapsing and deforming cannot be effectively transferred to the block land portion 4 adjacent in the tire width direction, which causes the block land portion 4 to excessively deform, also possibly causing the wear resulting from the sliding of the block land portion 4.

Yet further, it is preferable that the distance $d_1$ between the block land portions adjacent in the tire circumferential direction is in a range of 3.0 to 10.0 mm, and is more preferably in a range of 4.0 to 8.0 mm. In a case where the distance $d_1$ between the block land portions adjacent in the tire circumferential direction exceeds 10.0 mm, the distance $d_1$ between the block land portions adjacent in the tire circumferential direction is undesirably long. Therefore, the road-contacting pressure at the block land portion 4 excessively increases, possibly reducing the wear resistance. On the other hand, in a case where the distance $d_1$ between the block land portions adjacent in the tire circumferential direction is less than 3.0 mm, the distance $d_1$ between the block land portions adjacent in the tire circumferential direction is undesirably short. Therefore, the block land portions 4 are brought into contact with each other when the tire is brought into contact with the road surface, and deformation occurs due to expansion of rubber as illustrated in FIG. 5, possibly reducing the wear resistance.

Yet further, as illustrated in FIGS. 10 and 11, it is preferable that the block land portion 4 is provided with a narrow groove 11 communicating, in the tire width direction, the two circumferential grooves 2, 2 adjacent to said block land portion 4. In general, the block land portion without the narrow groove tends to decrease its grip force toward the trailing edge side, and hence, there is a possibility that a desired gripping performance cannot be obtained at the block land portion. However, as described above, by disposing the narrow groove 11 on the block land portion 4 and providing an additional trailing edge 9 to the block land portion 4, it is possible to generally improve the gripping force at the block land portion 4. Therefore, it is possible to efficiently convert the torque from the engine into the driving force, thereby improving the gripping performance. Note that, at this time, the narrow groove 11 may be curved or bent within the block land portion 4.

Further, it is preferable for the narrow groove 11 to open to the circumferential groove 2 at the central portion 7 of the block land portion 4. This is because, in a case where the narrow groove 11 opens at a region other than the central portion 7 of the block land portion 4, the gripping force serving as the driving force cannot be dispersed in a well-balanced manner within the block land portion 4, and hence, there is a possibility that the torque from the engine cannot be efficiently converted into the driving force.

Yet further, it is preferable for a length of the narrow groove 11 in the tire circumferential direction to be in a range of 5 to 20% of a depth (depth in a radial direction) of the lateral groove 3, and more preferably be in a range of 7 to 18%. In a case where the length of the narrow groove 11 in the tire circumferential direction is less than 5% of the depth of the lateral groove 3, the length of the narrow groove 11 in the tire circumferential direction is undesirably short. As a result, similar to a case where the block land portion 4 is not provided with the narrow groove 11, the gripping force decreases from the leading edge 10 toward the trailing edge 9, and hence, there is a possibility that the effect obtained by disposing the narrow groove 11 does not work. On the other hand, in a case where the length of the narrow groove 11 in the tire circumferential direction exceeds 20% of the depth of the lateral groove 3, the length of the narrow groove 11 in the tire circumferential direction is undesirably long. As a result, the force resulting from the reaction between the block land portions 4, each of which is separated by the narrow groove 11, cannot be transferred, causing the block land portion to excessively collapse and deform, and possibly causing the sliding wear. Further, in order to maintain the sufficient effect until the end of the wear, it is preferable for the depth of the narrow groove 11 to be in a range of 60 to 100% of the depth of the lateral groove 3.

It should be noted that the description above is only a part of the embodiment of the present invention, and it may be possible to combine these configurations or apply various modifications without departing from the gist of the present invention. For example, in tires having the configurations illustrated in FIGS. 9 through 11, two block land portion arrays 5 form one unit, and three units of the block land portion arrays 5 are arranged on the surface of the tread portion. However, it may be possible to form one unit by three or more block land portion arrays 5 and arrange them on the surface of the tread portion.

Example

Next, pneumatic tires (Example tire) according to the present invention and pneumatic tires (Comparative Example tire) having the configurations same as the tire according to the present invention except that all the groove portions between the block land portions adjacent in the tire width direction have equal inclination angles θ were prepared as samples of tires for heavy load having a size of 445/50R22.5, and performance evaluation was made on those tires. Details of the evaluation will be described below.

Figure 1:
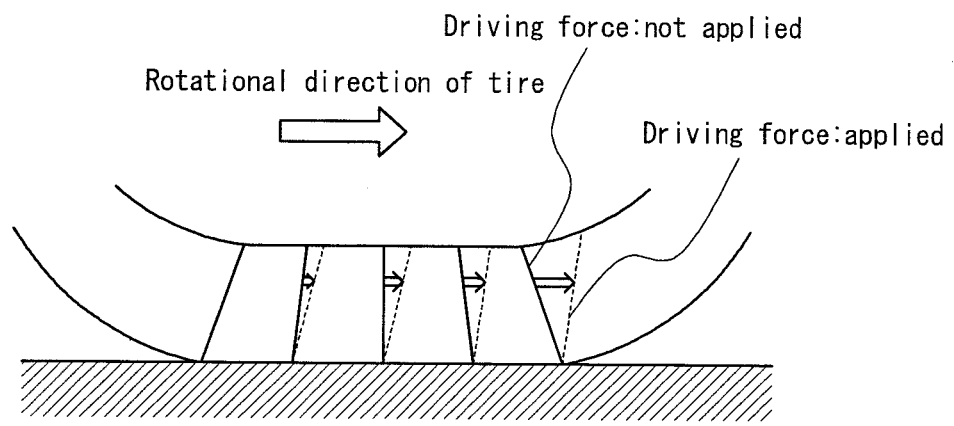
FIG. 1 is a diagram illustrating a relationship between the presence and existence of the load by driving force and positions to which a tread portion moves.
Figure 2:
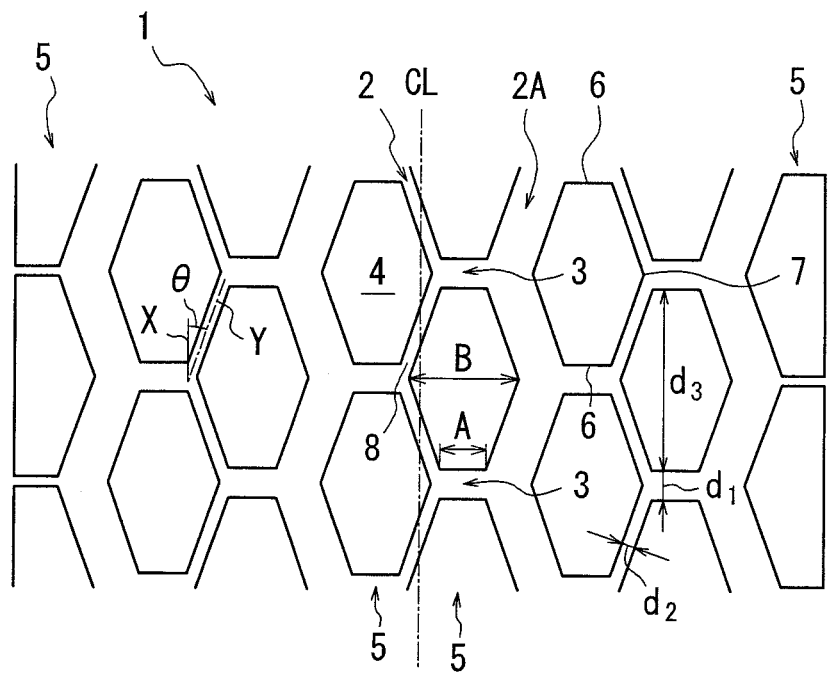
FIG. 2 is a development view illustrating a part of a tread portion of a comparative example tire.
Figure 3:
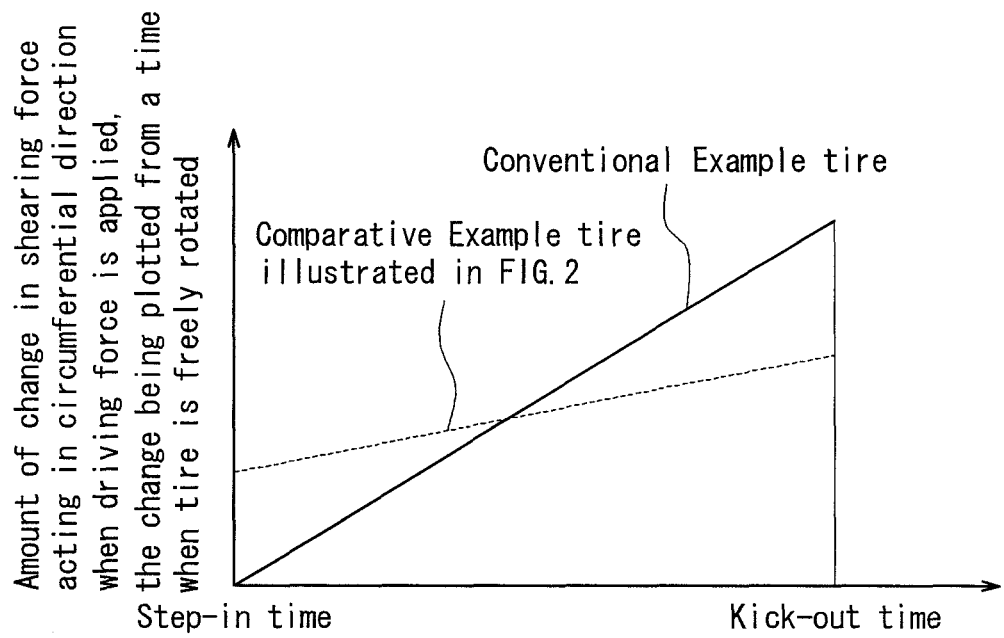
FIG. 3 is a view illustrating a shearing force from a road surface when driving force is applied.
Figure 4:
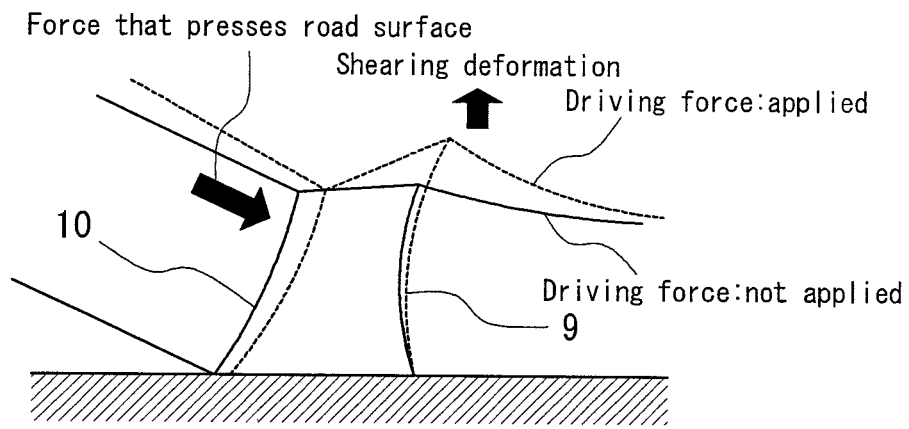
FIG. 4 is a view illustrating deformation of adjacent block land portions when the driving force is applied.

Comparative Example tires and Example tires have tread portions having configurations illustrated in FIGS. 2 and 9, respectively. As illustrated in FIG. 2, Comparative Example tires were configured such that: block land portion arrays are provided on a tread portion; of the block land portion arrays, two block land portion arrays located in the vicinity of the equatorial plane of the tire are arranged in a manner that a groove portion between block land portions adjacent in the width direction of the tire extends obliquely with respect to a tire width direction and a tire circumferential direction; a distance between block land portions adjacent in the tire width direction is shorter than a distance between block land portions adjacent in the tire circumferential direction; a length of a block land portion in a widthwise cross section increases from both edge portions of the block land portion in the tire circumferential direction toward a central portion of the block land portion; and, all inclination angles θ of an extending direction of the groove portion between the block land portions adjacent in the tire width direction with respect to the tire circumferential direction are 20°. As illustrated in FIG. 9, Example tires were configured such that: block land portion arrays are provided on a tread portion; of the block land portion arrays, two block land portion arrays located in the vicinity of the equatorial plane of the tire are arranged in a manner that a distance between block land portions adjacent in the tire width direction is shorter than a distance between block land portions adjacent in the tire circumferential direction; a length of a block land portion in a widthwise cross section increases from both edge portions of the block land portion in the tire circumferential direction toward a central portion of the block land portion; a groove portion between block land portions adjacent in the width direction of the tire extends obliquely with respect to a tire width direction and a tire circumferential direction; and, an inclination angle of an extending direction of the groove between block land portions adjacent in the tire width direction with respect to the tire circumferential direction increases toward groove portions located closer to the tire equatorial plane, an inclination angle $\theta_1$ of the groove located on a tire equatorial plane side is 30°, and an inclination angle $\theta_2$ of the groove portion located on a shoulder side of the tire is 10°.

Each of the sample tires described above was assembled with a rim of 14.0×22.5 to form tire wheels; tire wheels of Comparative Example tire were mounted to a left wheel of a driving shaft of each of a truck vehicle and a bus vehicle for use in tests; tire wheels of Example tire were mounted to a right wheel thereof; these sample tires were inflated at a pressure of 900 kPa (relative pressure), load mass of 50 kN was applied to the tires, and the right and the left sides of the tire wheels were alternately exchanged every time the vehicles travel 3000 km on a test course with a dry road; and after traveling 12000 km in total, measurement was made on the amount of wear at the central portion of the block land portion in the block land portion arrays located on the tire equatorial side and the amount of wear at the central portion of the block land portion in the block land portion arrays located on the outer side than the former block land portion (on the shoulder side). Evaluation on the wear resistance performance was made by comparing the wear difference between the respective block land portions and the average wear difference thereof. Table 1 shows the results.

TABLE 1

|  |  | Amount of wear at central portion of block land portion in block land portion array located on tire equatorial plane side (α) | Amount of wear at central portion of block land portion in block land portion array located on shoulder side (β) | Difference of wear between α and β | Average wear amount |
| --- | --- | --- | --- | --- | --- |
| Truck vehicle | Comparative Example tire | 10.8 mm | 6.0 mm | 4.8 mm | 8.4 mm |
|  | Example tire | 6.4 mm | 5.8 mm | 0.6 mm | 6.1 mm |
| Bus vehicle | Comparative Example tire | 15.4 mm | 10.2 mm | 5.2 mm | 12.8 mm |
|  | Example tire | 10.2 mm | 9.0 mm | 1.2 mm | 9.6 mm |

As can be clearly understood from the results shown in Table 1, in both of the truck vehicle and the bus vehicle, Example tires exhibit reduced difference between the amount of wear at the central portion of the block land portion in the block land portion arrays located on the tire equatorial plane side and the amount of wear at the central portion of the block land portion in the block land portion arrays located on the shoulder side, as well as reduced average wear amount thereof, as compared with Comparative Example tires.

INDUSTRIAL APPLICABILITY

As can be clearly understood from the description above, it is possible to provide a tire possessing improved wear resistance by optimizing the configuration of block land portions.

EXPLANATION OF REFERENCE CHARACTERS

1 Tread portion
2, 2A Circumferential groove
3 Lateral groove
4 Block land portion
5 Block land portion array
6 Edge portion of block land portion in a tire circumferential direction
7 Central portion of block land portion
8, 8A, 8B Groove portion between block land portions adjacent in a tire width direction
9 Trailing edge
10 Leading edge
11 Narrow groove

The invention claimed is:

1. A tire having, on a tread portion, a plurality of circumferential grooves extending in a circumferential direction of the tire and a plurality of lateral grooves each communicating two adjacent circumferential grooves, thereby to define a plurality of block land portion arrays formed by a large number of block land portions, wherein, in at least two adjacent block land portion arrays sandwiching a circumferential groove of the plurality of circumferential grooves, adjacent block land portions constituting each of the block land portion arrays are arranged so as to be positionally displaced from each other in the tire circumferential direction;

a distance between the block land portions adjacent in the tire width direction is shorter than a distance between the block land portions adjacent in the tire circumferential direction;

a groove portion between the block land portions adjacent in the tire width direction extends obliquely with respect to the tire width direction and the tire circumferential direction;

a plurality of sets each comprising at least two adjacent block land portion arrays sandwiching a circumferential groove of the plurality of circumferential grooves are arranged; and, among the block land portions arrays, an inclination angle of an extending direction of the groove portion between the block land portions adjacent in the tire width direction of block land portion arrays located closest to a tire equatorial plane side with respect to the tire circumferential direction is larger than an inclination angle of an extending direction of the groove portion between the block land portions adjacent in the tire width direction of block land portion arrays located at the outermost side in the tire width direction with respect to the tire circumferential direction, wherein a length of a block land portion of the plurality of block land portion arrays in a widthwise cross section of the tire continuously increases from both edge portions of the block land portion in the tire circumferential direction toward a central portion of the block land portion, wherein among groove portions of the plurality of sets, each of the groove portions provided between the block land portions adjacent in the tire width direction of the plurality of sets, an inclination angle of the groove portion located closest to a shoulder with respect to the tire circumferential direction is less than or equal to 20°.

2. The tire according to claim 1, wherein,
in the block land portion arrays sandwiching the circumferential groove and adjacent to each other, the inclination angle of the extending direction of the groove portion between the block land portions adjacent in the tire width direction with respect to the tire circumferential direction is set such that the groove portion located closer to the tire equatorial plane has the larger inclination angle than an inclination angle of an extending direction of the groove portion between the block land portions adjacent in the tire width direction of block land portion arrays located farther from the tire equatorial plane.

3. The tire according to claim 1, wherein,
among groove portions of the plurality of sets, each of the groove portions provided between the block land portions adjacent in the tire width direction of the plurality of sets, an inclination angle of the groove portion located closest to the equatorial plane with respect to the tire circumferential direction is in a range of 15 to 70°.

4. The tire according to claim 1, wherein
a ratio of a distance between the block land portions adjacent in the tire width direction of the plurality of sets with respect to a distance between the block land portions adjacent in the tire circumferential direction of the plurality of sets is in a range of 0.85:1 to 0.3:1.

5. The tire according to claim 1, wherein
a ratio of a distance between the block land portions adjacent in the tire circumferential direction with respect to a length of the block land portion in the tire circumferential direction is in a range of 0.25:1 to 0.05:1.

6. The tire according to claim 1, wherein
a distance between the block land portions adjacent in the tire width direction of the plurality of sets is in a range of 1.0 to 5.0 mm.

7. The tire according to claim 1, wherein
a distance between the block land portions adjacent in the tire circumferential direction is in a range of 3.0 to 10.0 mm.

8. The tire according to claim 1, wherein
each of the block land portions is provided with a narrow groove communicating, in the tire width direction, two circumferential grooves adjacent to said block land portion.

9. The tire according to claim 8, wherein
the narrow groove opens to the circumferential groove at the central portion of the block land portion.

10. The tire according to claim 8, wherein
a width of the narrow groove in the tire circumferential direction is in a range of 5 to 20% of a depth of a lateral groove.

11. The tire according to claim 9, wherein
a width of the narrow groove in the tire circumferential direction is in a range of 5 to 20% of a depth of a lateral groove.

* * * * *